United States Patent Office 3,231,491
Patented Jan. 25, 1966

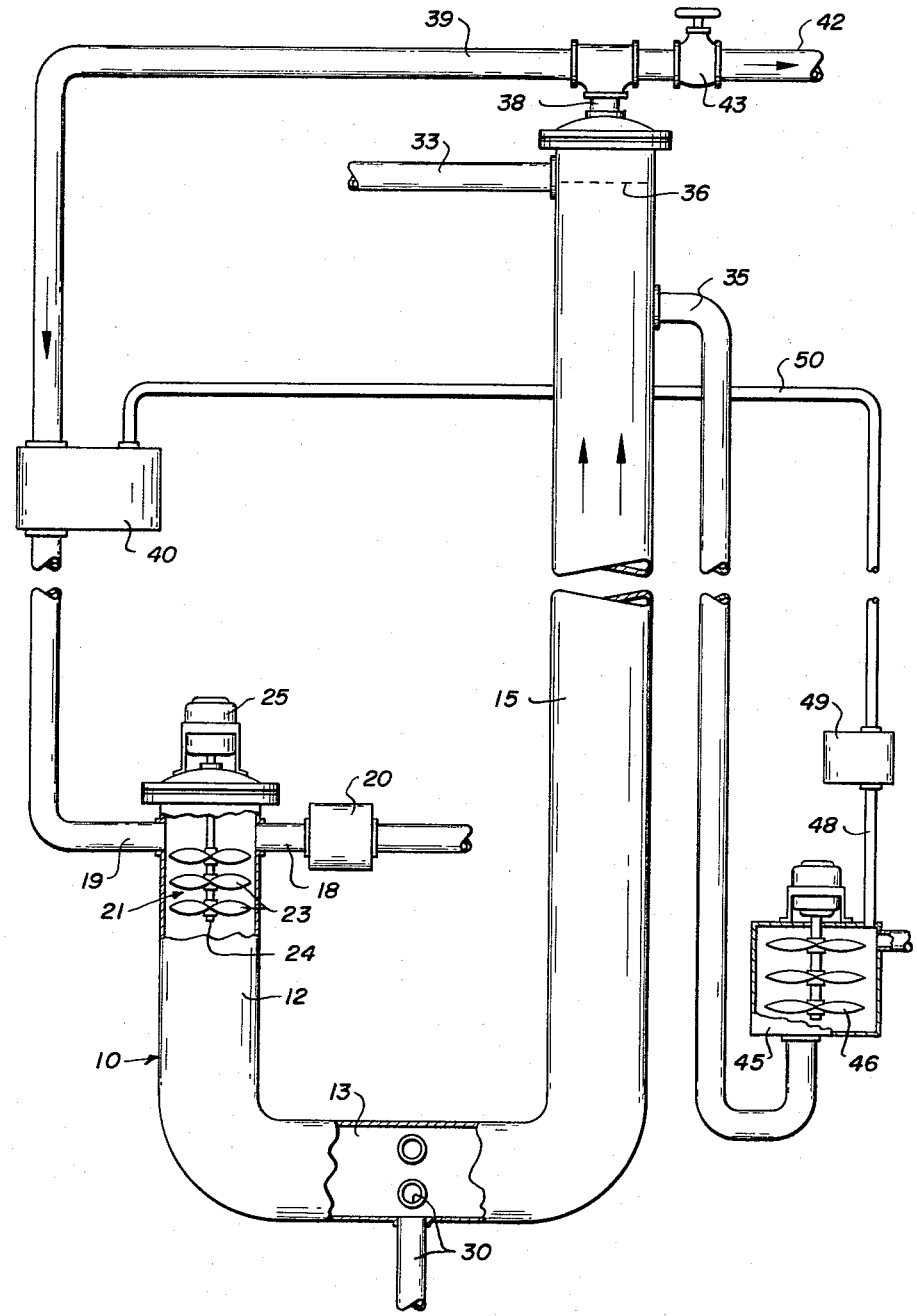

3,231,491
METHOD OF DESALTING LIQUIDS
George Knap, 4408 Wildwood Crescent, Burnaby,
British Columbia, Canada
Filed Oct. 11, 1963, Ser. No. 315,597
3 Claims. (Cl. 210—21)

This invention relates to methods of removing sodium chloride and other salts from liquids, such as sea water and the like.

The solubility of many gases in water is decreased by the addition of other solutes, particularly electrolytes, to the solution. The extent of this "salting out" varies considerably with different salt, but with a given salt, the relative decrease in solubility is the same for different gases. The theory of the salting out effect of a gas is complex. One explanation that has been suggested is that salting out is caused by hydration of the salts. A portion of the water combines with the salt, and the water which is thus removed is no longer free to absorb gas.

When a bubble of gas is formed in liquid, a liquid-gas interface is produced in which, owing to surface tension and hydration, there is a greater concentration of the salt than in the liquid itself. As the bubble of gas moves upwardly in the liquid, the film of concentrated salt solution around the bubble is dragged with it. Thus, the salting-out process not only liberates the gas, but also increases the concentration of the salt in the top layer of the solution.

The method of desalting liquids according to the present invention comprises mixing a gas into a column of a salt-containing liquid and allowing the gas to rise through the liquid to the top of the column. This forms a foam on top of the water which has a higher percentage of salt in it than was in the original saline solution. The salinity of the solution is reduced in this manner, and the process is continued until the percentage of salt to the liquid drops to a desired level. An alternative method is to mix a gas into a column of a saline solution, and directing the liquid-gas mixture upwardly in a vertical column for a distance sufficient to permit the gas to travel upwardly at a greater speed than the liquid, said gas carrying salt with it to the top of the liquid to concentrate salt near said top and in a foam at said top, drawing off concentrated liquid and foam from the top of the liquid column and, if desired, drawing off liquid of reduced salt content below said top. This utilizes the fact that gas travelling upwardly through the liquid in the form of bubbles takes with it concentrated salt solution, the salt being left in the liquid or in foam as the gas leaves the latter. For example, carbon dioxide bubbled upwardly through a column of salt water takes salt to the surface of the water and into a foam at said surface where it is left as the gas passes out of the water. Thus, water and foam drawn off at the top of the column includes a concentration of salts, while water drawn off from a point below the column top, has less salt than the first drawn water but more than the original solution. The remaining water has considerably less salt in it than the original solution.

The invention can be carried out in several ways. In the preferred method, gas and the salt-containing liquid are mixed together and directed into the bottom of a vertical container. The gas travels upwardly through a column of the liquid taking salts with it and forming foam on the top of said column. The liquid-gas mixture may flow continuously into the bottom of the container, in which case, concentrated liquid and foam are continuously moved from near the top of the column, while desalted liquid is removed from near the bottom of the column.

The accompanying drawing diagrammatically illustrates by way of example apparatus for carrying out the method of this invention.

Referring to the drawing, apparatus 10 is substantially in the form of a U-shaped tube having a short vertical entrance section 12 connected by a horizontal passage 13 to a high vertical column 15. Liquid containing salt is directed into the top of entrance section 12 by a pipe 18, while gas is directed into this liquid by pipe 19. It is perferable to precool the saline liquid, and this is done in any suitable manner, such as by a refrigerating unit 20. A mixer 21 is mounted in the top of section 12, said mixer including impeller blades 23 mounted on a shaft 24 which extends upwardly out of the entrance section and is rotated by a motor 25.

Passage 13 has one or more drain outlets 30, said outlets being arranged at different vertical levels relative to passage 13.

Concentrated liquid and foam are drawn off the top of column 15 through pipe 33. Less concentrated liquid is drawn off from said column through pipe 35 spaced below the top of the liquid, indicated by line 36. If the gas is to be saved or recycled, it is drawn off from the top of column 15 through pipe 38, said pipe being connected to a return pipe 39 which extends to a compressor 40, the outlet of which is connected to pipe 19. Gas may be removed from the system through pipe 42 which is connected to outlet pipe 38, and is controlled by a valve 43.

If desired, the solution drawn off through pipe 35 may be directed into a container 45 having a power driven agitator 46 therein for separating any gas which may still be in this liquid. The gas is drawn from container 45 through pipe 48 by a vacuum pump 49, the discharger of which is connected by a pipe 50 to compressor 40.

The saline solution, such as sea water, is directed by pipe 18 into the top of entrance section 12 of apparatus 10. Gas under pressure is directed into this liquid, and the two are mixed thoroughly by mixer 21. The gas and liquid travel downwardly through section 12, horizontally through passage 13 and upwardly through column 15. The gas travels upwardly faster than the liquid and carries with it salt so that a concentrated solution is formed at the top of column 15. Furthermore, a foam is formed on top of the liquid column which is of greater salinity than the original solution. Said concentrated solution and foam are drawn off through pipe 33. Liquid containing less salt is drawn off through pipe 35, and any gas which may travel with this liquid is separated therefrom in container 45 and returned to the system by pump 49. Similarly, gas leaves the liquid at the top of column 15 and is directed by pipes 38 and 39 to compressor 40 which returns it to the apparatus through pipe 19.

If the supply of sea water to entrance section 12 is stopped, and the gas directed through the liquid in the apparatus for a time, a large percentage of salt is drawn off the top of the water column as foam. The remaining liquid is then drawn off through outlet 30.

Gas is directed into the water in entrance section 12 in sufficient pressure and quantity completely to saturate the liquid. The water in column 15 must be high enough to create sufficient pressure at the bottom of the apparatus to permit this to be done. As an alternative, a pressure regulating valve may be connected in pipe 38 so as to permit the gas to pass out through said pipe only when the required pressure is attained in the system.

Water may be treated in apparatus 10 either in batches or continuously. As the pressure in the water in column 15 gradually decreases towards the top of said column, the gas is released from the water and bubbles to the top thereof.

The following experiment indicates the operation of this process:

A transparent, substantially U-shaped tube similar to the one illustrated in the drawing was used. This tube had a short leg or entrance section one foot long, and a long vertical column or leg 15 feet long. A relief valve and pressure gauge were provided at an outlet at the top of the long leg. Salt water at a temperature of 68° F. was analyzed and found to contain about .89% salt.

The tube was filled to a level of 14 feet with this sea water. Carbon dioxide at 75 lbs. per sq. inch pressure was directed through a pressure fitting into the top of the short leg for about 30 minutes. At this point, the pressure was equalized as indicated by the pressure gauge at the outlet, and the equilibrium condition for the pressure and temperature setting was established. When the outlet relief setting was exceeded, the foaming cycle commenced. The escaping foam was collected in glass containers. Twenty-five percent of the original water was extracted in this manner. The removed sample was tested and found to contain .96% salt.

The control parameters were pressure and temperature, the pressure being controlled by the setting of the relief valve.

What I claim as my invention is:

1. The method of desalting liquids which comprises mixing carbon dioxide under pressure with a saline solution in one leg of a U-shaped tube, directing said gas-solution mixture downwardly in said one leg and allowing the mixture to rise in a second leg of said tube, maintaining the pressure in the mixture at the bottom of said second leg high enough to keep the liquid saturated at said bottom, said gas rising through the liquid in said second leg and taking salt with it to form a salt concentration at the top of the solution, said gas forming a foam containing a concentration of salt on top of the solution, and removing foam and liquid at the top of the column.

2. The method of desalting liquids which comprises mixing carbon dioxide under pressure with a saline solution in one leg of a U-shaped tube, directing said gas-solution mixture downwardly in said one leg and allowing the mixture to rise in a second leg of said tube, said second leg being tall enough to maintain sufficient pressure at the bottom thereof to keep the mixture saturated at said bottom, said gas rising through the liquid in said second leg and taking salt with it to form a salt concentration at the top of the solution, said gas forming a foam containing a concentration of salt on top of the solution, and removing foam and liquid at the top of the column.

3. The method of desalting liquids which comprises mixing carbon dioxide under pressure with a saline solution in one leg of a U-shaped tube, directing said gas-solution mixture downwardly in said one leg and allowing the mixture to rise in a second leg of said tube, the pressure of the mixture at the bottom of said second leg being maintained high enough to keep the liquid saturated at said bottom by means of a pressure regulating valve in a gas outlet at the top of said second leg, said gas rising through the liquid in said second leg and taking salt with it to form a salt concentration at the top of the solution, said gas forming of foam containing a concentration of salt on top of the solution, and removing foam and liquid at the top of the column.

References Cited in the file of this patent
UNITED STATES PATENTS 2,784,056  3/1957  Wiseman _____ 23—64
3,128,248  4/1964  Suzuki _____ 210—44

OTHER REFERENCES

Fresh Water From the Ocean by Ellis, copyright, 1954, by The Conservation Foundation Inc., article: "The Adsorption Method," pages 179–181 relied upon.

MORRIS O. WOLK, *Primary Examiner.*